US012062942B1

(12) United States Patent
Ballew et al.

(10) Patent No.: US 12,062,942 B1
(45) Date of Patent: Aug. 13, 2024

(54) EMERGENCY POWER DISTRIBUTION

(71) Applicant: UIPCO, LLC, San Antonio, TX (US)

(72) Inventors: Rachel Michelle Ballew, San Antonio, TX (US); Hanna Elizabeth Rafferty, San Antonio, TX (US); Jeorge Luis Fabre, San Antonio, TX (US); Gregory Brian Meyer, San Antonio, TX (US); Stacy Callaway Huggar, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 55 days.

(21) Appl. No.: 18/145,542

(22) Filed: Dec. 22, 2022

(51) Int. Cl.
*H02J 9/06* (2006.01)
*H02J 3/00* (2006.01)
*H02J 3/38* (2006.01)

(52) U.S. Cl.
CPC .............. *H02J 9/062* (2013.01); *H02J 3/001* (2020.01); *H02J 3/381* (2013.01); *H02J 3/388* (2020.01); *H02J 2300/10* (2020.01); *H02J 2300/22* (2020.01); *H02J 2300/28* (2020.01)

(58) Field of Classification Search
CPC .. H02J 9/062; H02J 3/001; H02J 3/381; H02J 3/388; H02J 2300/10; H02J 2300/22; H02J 2300/28
See application file for complete search history.

(56) References Cited

U.S. PATENT DOCUMENTS

| | | | |
|---|---|---|---|
| 10,903,652 B2 * | 1/2021 | Brissette | G06Q 10/04 |
| 2012/0029720 A1 * | 2/2012 | Cherian | H02J 13/00 700/297 |
| 2015/0012146 A1 * | 1/2015 | Cherian | H02J 13/00034 700/291 |
| 2015/0032278 A1 * | 1/2015 | Bhageria | H02J 4/00 700/295 |

* cited by examiner

Primary Examiner — Lincoln D Donovan
Assistant Examiner — Alex W Lam
(74) Attorney, Agent, or Firm — Potomac Law Group, PLLC; Dannon G. Allbee

(57) ABSTRACT

Methods and systems described herein are directed to alternatively sourcing and distributing power in the event of an expected deficiency in conventional power delivery. A power distribution system can define a cell of interlinked entities of power consumers and power producers, such as by identifying which of the entities are anticipated to experience the expected power deficiency, an amount of power allocated to one or more of the entities, and an ability of an entity to produce power. The system can control power distribution throughout the cell according to a power supply transmission schedule for the expected deficiency, where power can be sourced from one or more of a solar energy system, a wind turbine energy system, and a gasoline operated generator energy system, and disbursed to power consumers on a rotating basis.

20 Claims, 6 Drawing Sheets

EMERGENCY POWER DISTRIBUTION

The present disclosure is directed to methods and systems for sourcing and distributing power in the event of an expected deficiency in conventional power delivery.

BACKGROUND

Today's power grids typically provide consumers with needed amounts of power to undertake a variety of activities, such as cooking, lighting their homes and businesses, and engaging in communications. However, the flow of power that these grids ordinarily provide can be hampered or threatened by a number of exemplary emergency situations. Among these are aging or malfunctioning grid infrastructure, climatic events, and even the prospect of various forms of hacking. For instance, a climatic event can severely delay or wholly impair swaths of consumers from receiving needed energy that can be crucial to carrying out the daily tasks of living, obtaining medical care, etc. In these regards, technologies that can ensure access to reliable sources for generating and distributing power to those in need in dire situations can be helpful.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
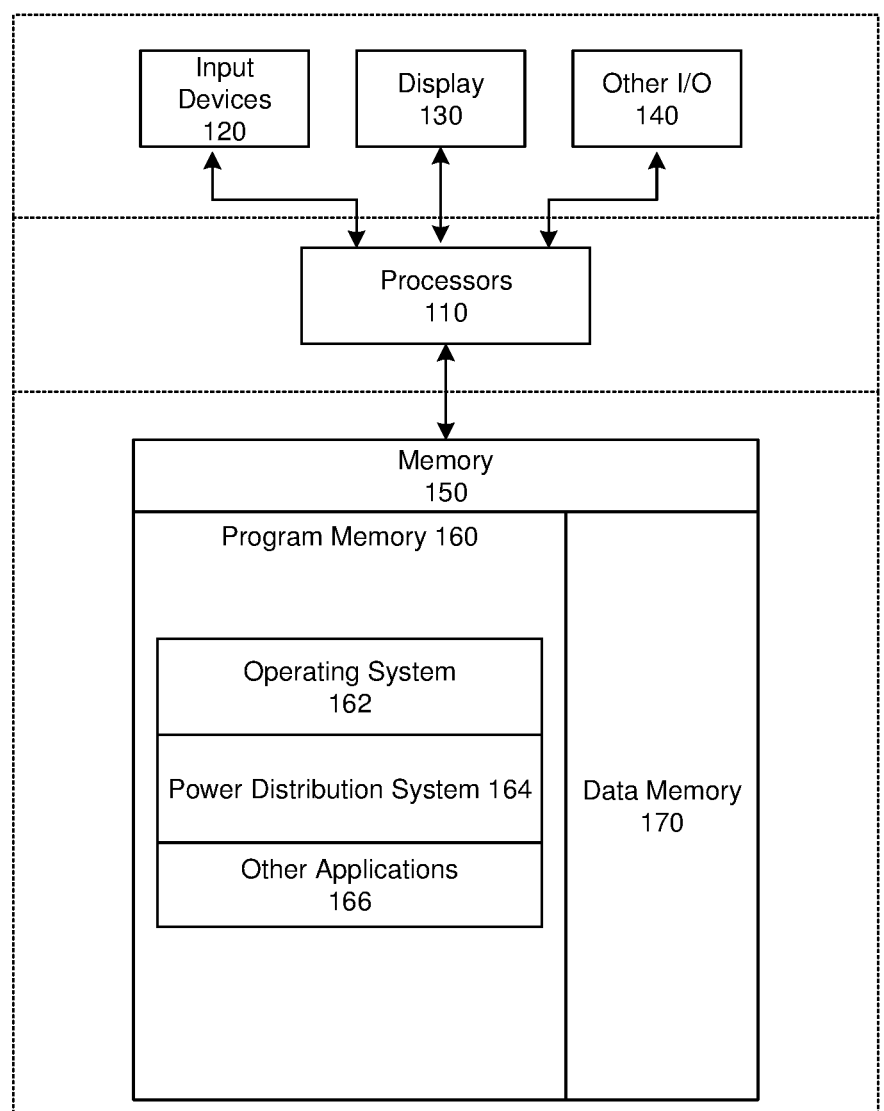
FIG. 1 is a block diagram illustrating an overview of devices on which some implementations can operate.

Aspects of the present disclosure are directed to mitigating deficiencies in conventional power generation and/or supply. Herein, the term, "deficiency," can refer to a diminishment in that generation and/or supply which can be expected as a result of identifying one or more emergency situations. In other words, implementations of the present technology can institute power generation and supply measures in response to detecting an expected deficiency in a conventional power supply. The detection can result from a notification from a power company that outages are expected when, for example, a rain, wind, and/or ice event occurs or there's heavy load on the normal power grid, a measurement of lower power supply, etc. In some cases, one or more of these measures can be preparatory, such as determining, in advance of such an event or measurement, available amounts of power that can be provided for distribution from one or more entities within a cell of entities predicted to be affected by the expected deficiency. In other cases, one or more of the measures can be reactionary, where, for instance, power generation and supply must occur "on the spot" as a result of the absence of a forewarning of an emergency circumstance occasioning need for the alternative energy discussed herein. In some cases, there may be a confluence of preparatory and reactionary measures depending on when that expected deficiency actually occurs. For example, pre-planned allocations for power distribution can be implemented during a time of an emergency circumstance (e.g., a weather event).

More particularly, a power distribution system, according to implementations of the present technology, can define one or more cells of entities that can be affected by an expected power deficiency for an emergency circumstance and that can benefit from alternative power supply and consumption channels. For instance, power that can be alternatively produced can be derived from solar, turbine, gasoline operated devices and like systems. The entities can be power consumers and power producers that are interlinked by a power distribution grid, where the grid infrastructure can be adapted for the aforementioned channels. For instance, the entities can be associated with the grid via respective switching devices that can be controlled, by one or more central controllers, to distinguish between the channels. In other words, the switches can be controlled to isolate a cell of entities from the normal power grid and can activate supply or consumption channels among the entities in a cell depending for example, on a scheduled and whether an entity is able to produce or only consume power.

In some implementations, the power distribution system can pool all available power that can be provided by entities for one or more of the cells, such that a collective sum of that power can be drawn upon by one or more power consumers within the one or more cells. In some implementations, the term "available power" can refer to an amount of power that is in excess of an amount of power allocated to one or more power producers, where the allocation is defined by the producers' own power generation system(s). That is, the term, "available power," can be used in some cases to refer to "disposable power" that can be contributed to the power distribution grid after the one or more power producers have met, according to power productions systems at their disposal, their own individual power needs. In other cases, "available power" can refer to an amount of power that can be channeled into a give cell of entities from the power producing entities in that cell.

In some implementations, such available power can be distributed according to a power supply transmission schedule that can define various aspects for the above-discussed power supply and consumption channels. For instance, the schedule can define one or more of a timing for power consumption from and introduction into the grid, a timing as to when one or more of the entities within the cell can operate as either a power consumer or a power producer, and amounts of power that can be consumed as a power consumer or produced and contributed to the grid as a power producer.

In an example implementation of the present technology, the power distribution system can, via one or more controllers thereof, define one or more cells of entities interlinked by a power distribution grid and isolate the entities in that cell from others on the power distribution gird in the event of an expected power deficiency. For instance, the power distribution system can receive a power company notification that an outage is expected, and resultingly, invoke the isolation. Upon doing so, the power distribution system can evaluate which entities of a cell, or cells, can be operable as either a power consumer or a power producer, according to the above-discussed power transmission supply schedule. According to the schedule's dictates, the power distribution system can then distribute power for the cell or cells such that selected ones of entities within the cell can receive power for a predetermined period of time, in a predetermined amount, etc. For example, implementations of the present technology can, according to the power supply transmission schedule, specify a single power consumer of all power distributed in the cell at a particular time.

Existing manners of generating and distributing alternative power operate largely on an ad hoc basis where sources for generating power and its distribution to groupings of recipients are determined spontaneously, e.g., in the aftermath of a natural disaster. A typical scenario may include a hurricane or other devastating weather event where generators are mobilized and used to power those in a vicinity of their location(s). As a result of this lack of planning, these conventional systems fail to assess and effectively correlate capacities for power generation and consumption in a way that can satisfactorily meet the power needs that may exist for an expected power deficiency. By contrast, implementations of the present technology resolve discontinuities in assessments and correlations for these relevant capacities so that an equitable distribution of power can result in the face of an expected power deficiency. In particular, a power distribution system, according to implementations of the present technology, can, for a cell of entities interlinked by an existing power distribution grid, variably control which of those entities is a power consumer or a power producer. For instance, such control can be implemented according to a power supply transmission schedule that can account for which of the entities is a power consumer or a power producer, and when and in what amount power consumption and production ought to occur. In some cases, some entities in a cell can only be power producers (e.g., mobile generators), some entities can be either power producers or consumers (e.g., a home with a solar, turbine, or gas power generation system), or can only be consumers (e.g., a home with no power production system). Using this information, the system can automatically carry out the distribution of power for the cell in a way that can be immediately responsive to an expected power deficiency as is described herein. As such and unlike conventional systems, the power distribution system according to implementations of the present technology can avoid the above types of discontinuities for power consumption and production. This way, potentially injurious delay that might otherwise accompany a response to a power emergency can be eliminated.

Several implementations are discussed below in more detail in reference to the figures. FIG. 1 is a block diagram illustrating an overview of devices on which some implementations of the disclosed technology can operate. The devices can comprise hardware components of a device 100 that can mitigate the effects of an expected power deficiency that can be associated with one or more types of power emergencies. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, power distribution system 164, and other application programs 166. Memory 150 can also include data memory 170, e.g., entity participant data, entity power consumption data, entity power production capacity data, switching assignments for entities, entity power consumption and production timing data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
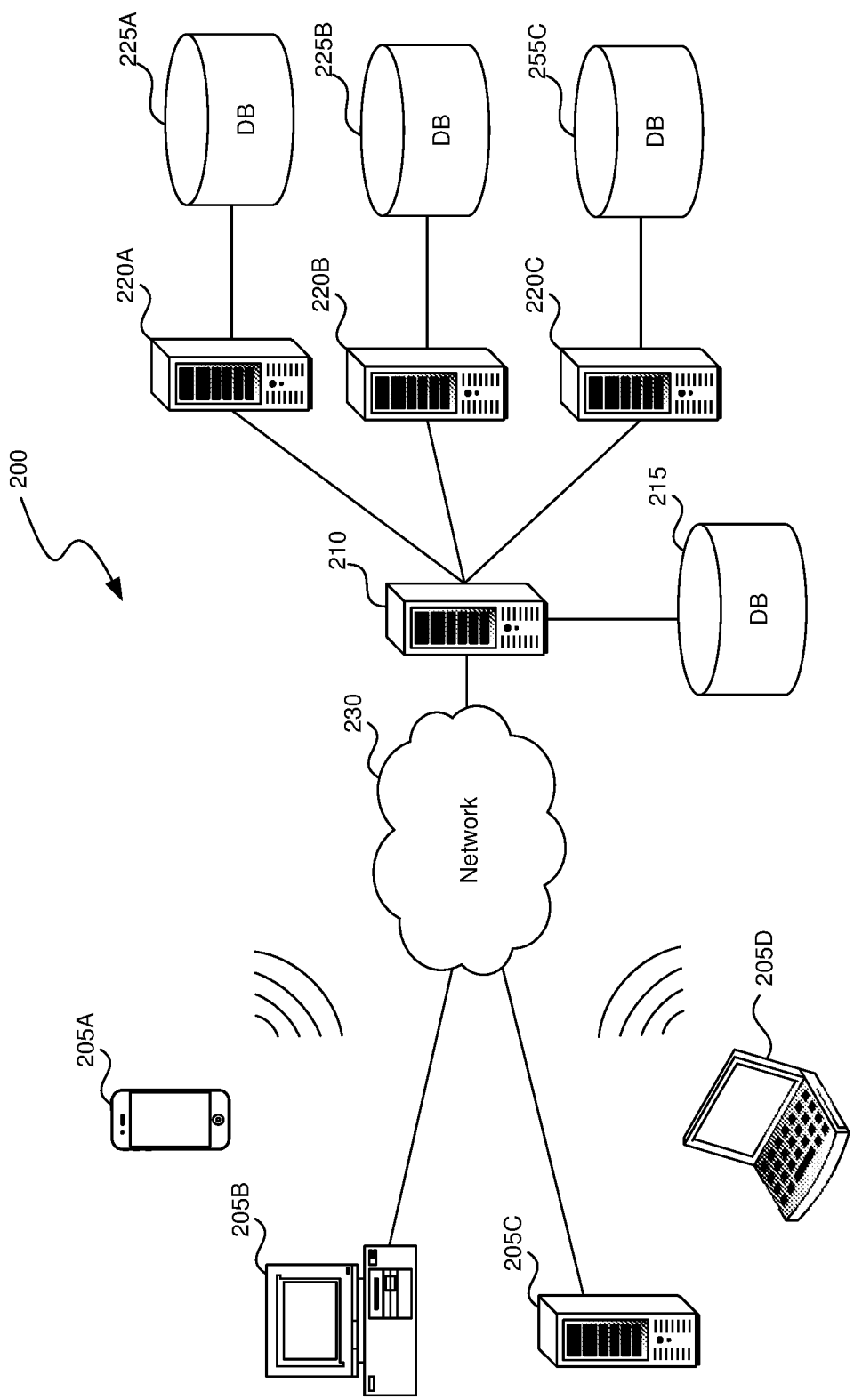
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as entity participant data, entity power consumption data, entity power production capacity data, switching assignments for entities, entity power consumption and production timing data. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
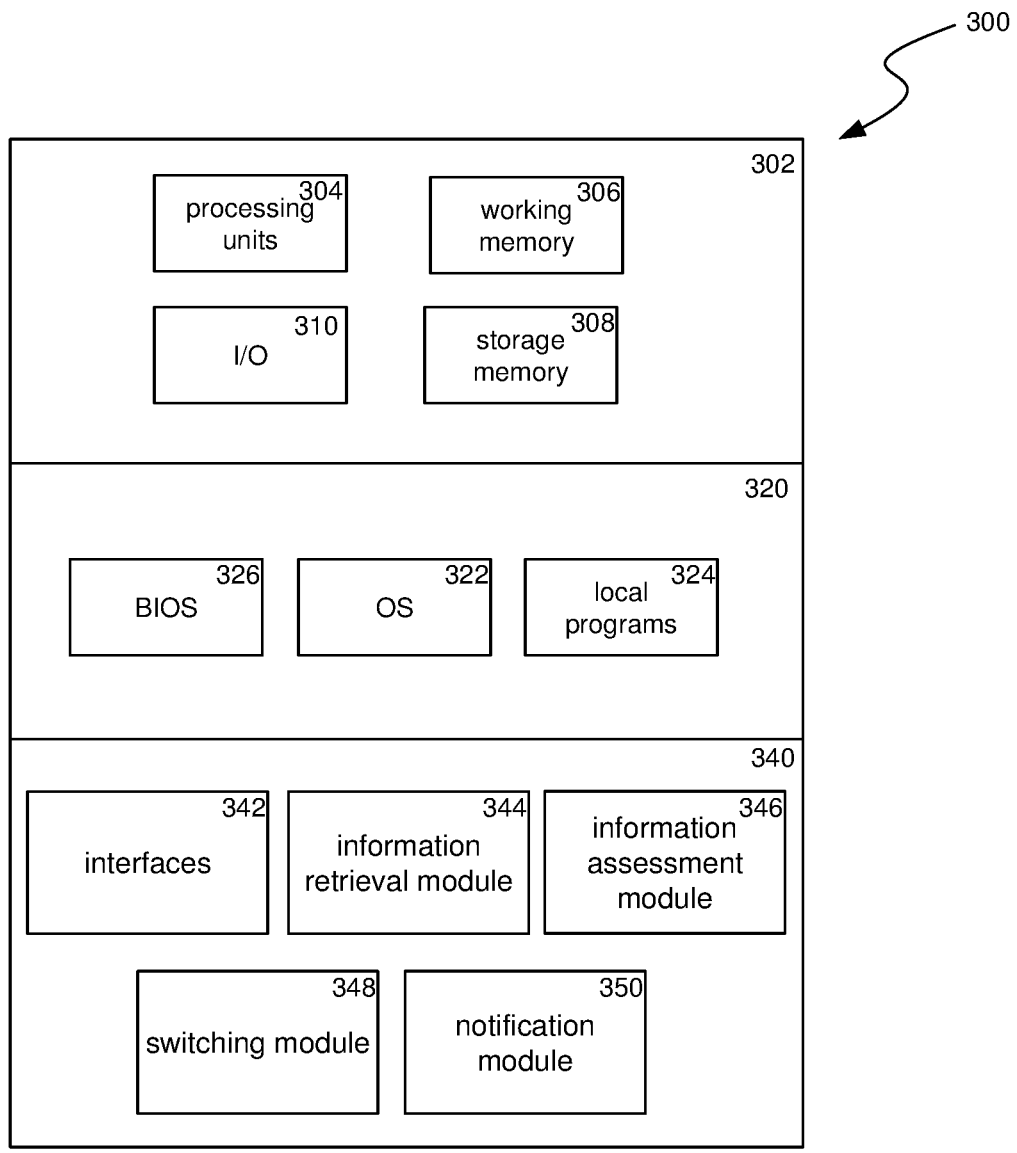
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include an information retrieval module 344, an information assessment module 346, a switching module 348, a notification module 350, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

In some implementations, information retrieval module 344 can retrieve participant data for one or more cells of entities that can be power consumers or power producers. For instance, the participant data can define whether an entity possesses an ability to generate and contribute, or only consume, power in the event of an expected power deficiency. In some implementations, the participant data can define a real-time capacity (i.e., an amount) for that power consumption or production. Information retrieval module 344 can further retrieve information concerning an expected power deficiency. As an example, information retrieval module 344 can retrieve power measurements or signaling, for an existing grid, that can indicate an expected power deficiency. As another example, information retrieval module 344 can retrieve one or more electronic notifications from a power company warning of an impending power outage. In these regards, information retrieval module 344 can further receive one or more electronic notifications from a power company notifying a cell of entities, as described herein, that such power company is relinquishing control of a power grid covering the cell for a predetermined period of time. Also, information retrieval module 344 can retrieve one or more electronic notifications from a weather service as to the tracking of a weather event that may cause, or has caused, a power outage. In some implementations, information retrieval module 344 can retrieve information, from one or more entities within a cell of entities, regarding a power consumption need as well a power production capability. Additional details on the types of information that can be retrieved by information retrieval module 344 are provided below in relation blocks 402 and 406 of FIG. 4, and block 502 of FIG. 5.

In some implementations, information assessment module 346 can variously assess aspects for entities with respect to their status as either a power consumer or a power producer within a cell of entities. For instance, information assessment module 346 can assess whether, according to a power capacity retrieved by information retrieval module 344, a particular entity is strictly a consumer or producer of power that can be made available and distributed by the power distribution system herein. In some implementations, information assessment module 346 can assess various metrics that can be used to formulate a power supply transmission schedule for power consumers and power producers in a cell of such entities. Examples of metrics that can be assessed by information assessment module 346 can include a current available power supply of a power producer, an ability to continually produce power in the face of an expected power deficiency, and an expectation for a power deficiency at a power producer (e.g., when power consumption capacity for that power producer can exceed power production capacity). Additional details on the types of information that can be assessed by information assessment module 346 are provided below in relation to block 402 of FIG. 4, and blocks 502 and 504 of FIG. 5.

In some implementations, switching module 348 can control a status for entities that can be power consumers or power producers. For instance, switching module 348 can control one or more switches associated with the entities to regulate an inbound or outbound flow of power with respect to the power distribution grid interlinking those entities—e.g., connecting a cell of entities to or isolating them from the power distribution grid. In some implementations, switching module 348 can control one or more of the switches to effect the respective flows; for instance, in the event of an expected power deficiency triggering the power supply transmission schedule assessed according to information assessment module 346, to control which entities in the cell can receive power (e.g., act as consumers) and which can provide power (e.g., act as producers). In these ways, switching module 348 can distribute power supply through a cell of entities according to the power supply transmission schedule. Additional details on switching operations that can be performed by switching module 348 are provided below in relation blocks 404, 408, and 410 of FIG. 4, and block 506 of FIG. 5.

In some implementations, notification module 350 can issue notifications to one or more power consumers and/or power producers. Such notifications can inform, for instance, when a cycle for power consumption and/or power production is to begin or end. Thus, the notifications can be in accordance with the power supply transmission schedule implemented according to the present technology, such that each of a power consuming entity and a power producing entity can be informed as to scheduling for when their respective roles can begin and end. In some implementations, the notifications can also inform power consumers and power producers for a cell of such entities with respect to levels (i.e., wattage) of power consumption and power production. Additional details on the types of notifications that can be issued by notification module 350 are provided below in relation block 410 of FIG. 4 and block 506 of FIG. 5.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
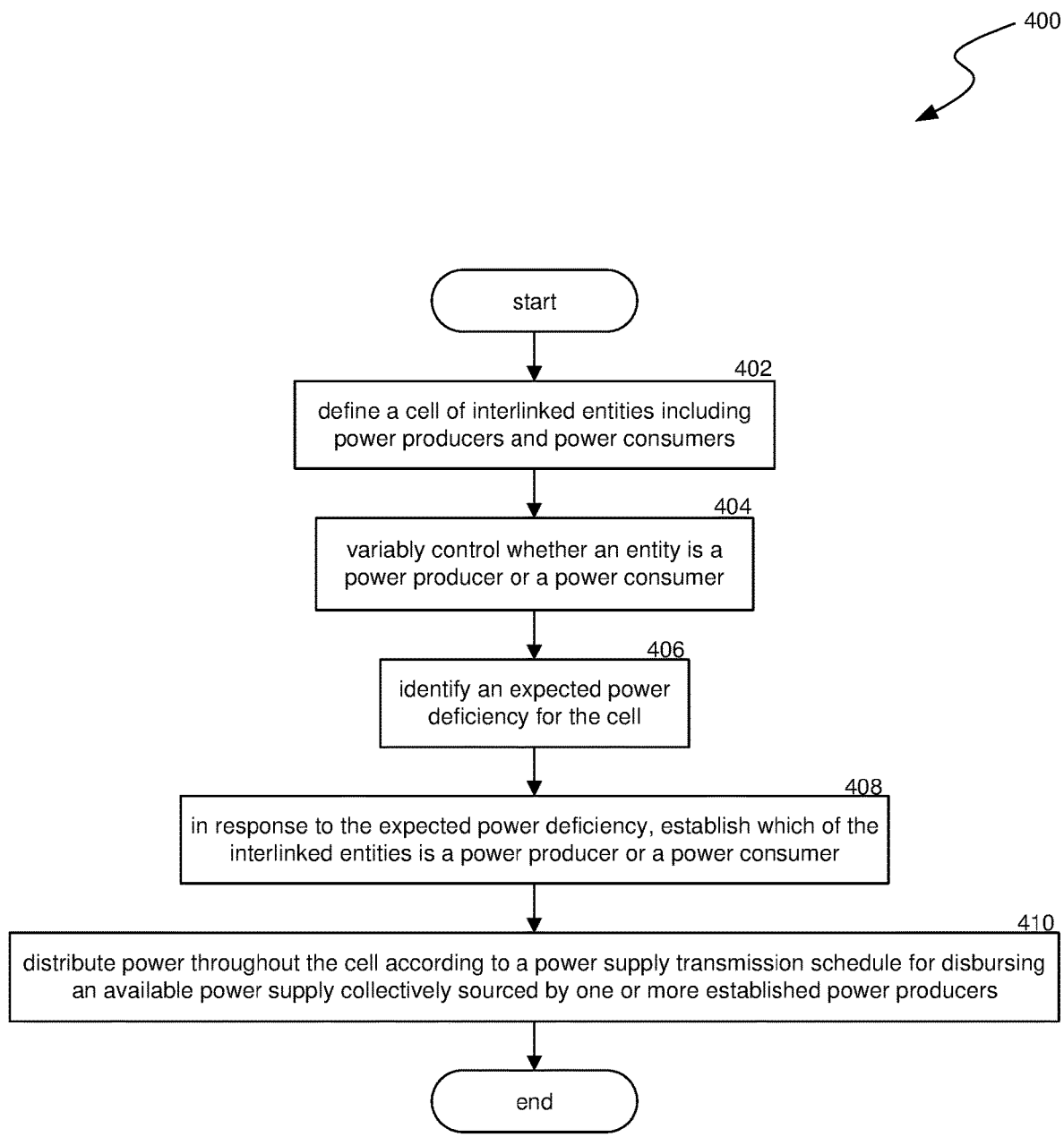
FIG. 4 is a flow diagram illustrating a process used in some implementations for alternatively distributing power in the event of an expected deficiency in conventional power delivery.

FIG. 4 is a flow diagram illustrating a process 400 used in some implementations for alternatively distributing power in the event of an expected deficiency in conventional power delivery. Process 400 can be initiated in response to identifying the deficiency as one which is about to occur or which is presently occurring. One or more portions of process 400 can be performed according to an application that can be executed on a server for power distribution system 164; alternatively, one or more portions of process 400 can be performed on a client device executing the application—e.g., as part of one of the entities in a cell or by one or more switch devices controlling power flow in a cell. In some cases, one or more portions of process 400, as discussed below, can be operated and/or coordinated by a controller (e.g., controller 614 and/or controller 616 in FIG. 6) controlled by execution of a power distribution application, where the controller can be a stand-alone device (i.e., a device disposed within or remote from a cell of entities) that can be equipped with all of the necessary hardware and/or software for implementing power distribution operations.

Process 400 can, at block 402, define a cell of interlinked entities including power producers and power consumers for the cell. For example, the entities can be interlinked by an existing power grid and include consumer homes, businesses in a shopping center, etc. Further, the entities can include mobile power generation devices and systems (e.g., mobile power generators) that can be adapted for connection with the power grid for the cell. Participation data for the cell of entities can be received by the controller, which can then record whether an entity ought to be registered as a power consumer, a power producer, or both. For instance, the participation data can include registration information (name, address, email, phone number, etc.) and denote whether an entity is or is not equipped with alternate forms of power production (solar, wind turbine, generator, etc.) that can be used to supply power in the event of an expected power deficiency. Additionally, the participation data can denote, for example, one or more metrics for an entity's power consumption (types of devices that need to be powered and respective power usages, etc.) or power production potential (i.e., amounts of power) from alternate energy production sources.

Thus, depending on their participation data, process 400 can designate entities as power producers and/or consumers for the defined cell. In some cases, the controller can isolate one or more of the interlinked entities from other power consuming facilities. For instance, and where two or more cells are defined for interlinked entities, the controller can be operated to disallow power to flow to one or more power consumers within a cell. To do so, the ability for one or more cell entities (such as consumer homes and commercial businesses) to operate as either a power consumer or a power producer can, at block 404, be variably controlled by process 400 (via controller 614 or 616) in accordance with a switch associated with each entity. That is, the controller can, except for an entity that is a provider of mobile power generation, operate the switch for each entity to control that entity's ability to either contribute or extract power that the grid can offer. In this regard, it is contemplated that the controller can communicate with a provider of mobile power generation to regulate a timing for and an amount of power that can be contributed by that entity.

In some implementations, the controller can receive notifications regarding an expected power deficiency. For instance, such notifications, as discussed above, can be issued by a power company responsible to provide regular flows of power to entities for a cell or cells thereof. An exemplary notification may be a shutoff notice for a cell of entities. Also, such notifications can be weather advisories issued by a weather service and informing of the potential for a power outage due to an upcoming or presently occurring weather event. Alternatively or in addition, the controller can itself measure a received level of power being fed to the grid, where a sudden or incremental decrease in power can signify an expected power deficiency. As can be understood, one or more of the above notifications and/or measurements can signify the expected power deficiency as a result of an identified emergency, such as a severe weather or catastrophic event.

In view of the above, process 400 can implement the controller to dynamically define entities into cells thereof according to one or more pieces of information for which the controller is aware. For instance, defining of the cells can be according to one or more items of information, such as which entities, according to one or more of the above notifications or power measurements, may experience an expected power deficiency; an amount of power allocated to one or more entities (i.e., one or more amounts of power that can be produced by a power producer); and a monitoring of whether a power producer continually possesses an ability to produce power that can be distributed to the grid. In this way, process 400 can formulate the definition for one or more cells of entities that can be power consumers and/or power producers so that preparation(s) for an expected power deficiency can be implemented.

At block 406, process 400 can identify an expected power deficiency. As has been discussed, the deficiency can be the result of the controller receiving various signaling (e.g., a power company notification, a weather advisory, power measurement, etc.) regarding potential for a shortfall in conventional power distribution. In some cases, the expected poser deficiency can be a measurement of an actual lack of power in the power grid or can be a projected loss of power, e.g., due to a weather event. In various implementations, a projected expected power deficiency can be based on a schedule of power outages, a machine learning model analysis (e.g., predicting power outages from time series data of previous outages or other probability analysis), a predicted weather event being above a threshold severity level, etc.

At block 408, process 400 can establish which of the interlinked entities, of one or more cells thereof, will be initially designated as a power producer or a power consumer. For instance, process 400 can invoke the above discussed switching to block an entity's participation in the grid such that the entity is isolated from the grid, to allow power consumption from the cell by a power producing entities in that cell. Thus, through establishment of the entities in the aforementioned capacities, process 400 can make operable one or more entities that can take or contribute power as a result of the expected power deficiency being identified. That is, process 400 can activate switching for the entities that can cause their status to be that of either a power consumer, a power producer, or neither. At block 410, process 400 can control switching for the various entities in a cell, thus causing power to be distributed throughout the cell from the power producing entities to the power consuming entities. Some entities in a cell may be temporarily set as inert—neither producing nor consuming power until their turn to be a power consumer arrives.

In various implementations, process 400 can repeat blocks 408 and 410 throughout a power loss event (e.g., until the expected power deficiency ends or until power is restored to the normal power grid)—thereby updating which entities in a cell are the current power consumers and producers, e.g., according to a power supply transmission schedule and/or defined power needs. In some implementations, such a schedule can delineate certain parameters for the disbursement of power from the grid to consumers or for the production of power from any one power producer. For instance, the parameters can include an amount of power to be disbursed, where, in the case of an individual producer, that amount can be available power that the producer can contribute. To recall, in some cases, available power can refer to one or more amounts of power that are over and above those required by the producer to sustain her own power requirements while in other cases, available power can refer to an amount of power that can be channeled into a give cell of entities from the power producing entities in that cell.

The schedule parameters can further include one or more timings for when an entity can be operable (e.g., switched) as a power consumer. For instance, the timings may be temporal in nature so as to define a particular time period. Otherwise, the timings may be characterized by an amount (e.g., an allocation) of power that a consumer can draw from the cell. As an example, the timings can specify that all power that can be drawn from the cell can, at any given time, be consumed by a sole power consumer, where that consumption may be further limited by a particular amount of power that such consumer can draw for the given time period. Additional details regarding the formulation of the power supply transmission schedule are discussed below in relation to FIG. 5.

Figure 5:
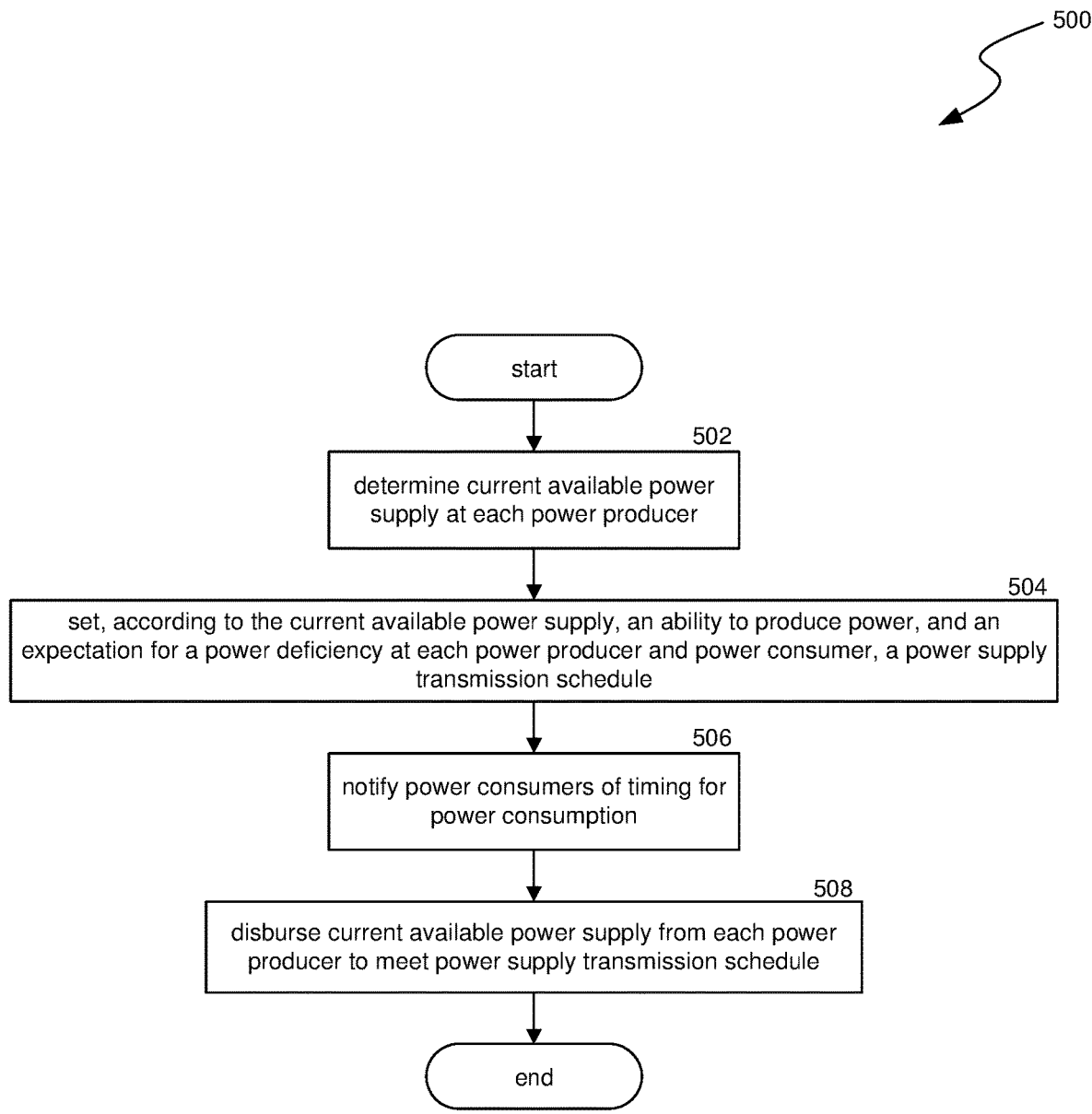
FIG. 5 is a flow diagram illustrating a process used in some implementations for setting a power supply transmission schedule according to which power can be distributed according to FIG. 4.

FIG. 5 is a flow diagram illustrating a process 500 used in some implementations for setting the power supply transmission schedule according to which power can be distributed according to FIG. 4. Process 500 can be initiated when it is necessary to, in response to an expected power deficiency, share alternative forms of energy from a cell of a power distribution grid interlinking entities as are discussed herein. In some implementations, process 500 can be performed as a sub-process of process 400 of FIG. 4, e.g., at block 410. One or more portions of process 500 can be performed on server that can execute an application in receipt of data for the expected power deficiency, while, in some cases, one or more portions of process 500 can be performed on a client device executing that same application and receiving that same data.

At block 502, process 500 can determine a current available power supply at each power producer for a cell of entities. That is, process 500 can receive, from each producer, notification of an amount of alternative power that the producer can produce as available power that can be contributed to the grid. In this regard, process 500 can, in connection with one or more of such received amounts, also receive relevant timeframes for their production, an anticipated delivery time that the amounts can be made available to the grid, and/or timeframes for further production of power once the current supply is depleted.

At block 504, process 500 can set a power supply transmission schedule that can be used to distribute power from the grid interlinking power consumers and power producers. For example, process 500 can set such a schedule according to a number of criteria, including the current available power supply determined at block 502. In some implementations, the criteria can further include a determination for whether a producer has an ability to continually produce power that can be contributed to the grid. For instance, process 500 can use this criteria to know whether or when a producer's active production for the grid will be depleted, and resultingly, when to cycle to another producer. In some implementations, the criteria can also include whether there is an expectation that a given producer will, itself, experience a power deficiency due to, for example, a weather event. This way, process 500 can arrange the schedule to selectively integrate available power that such a producer has to contribute to the grid. In other words, process 500 can set the power supply transmission schedule without adding such available power since that particular producer may be in need of those amounts of power that the producer has offered to contribute. As an example and in a case in which a large cell is configured rectangularly, the discussed producer may be located in a southwestern corner of the cell which is forecast to be impacted by a weather event hours before remaining portions of the cell. In such a case, process 500 can set the schedule to reserve any available power supply to the so located producer. In some implementations, the criteria can further include a predetermined timing (e.g., a time of day, a day of the week, etc.) for when a particular power producer can contribute available power to its assigned cell.

At block 506, process 500 can notify entities within a cell or cells thereof as to when those entities are scheduled to be power consumers for the cell so that they may draw upon an available power supply for the power distribution grid. In some implementations, the notifications can be in the form of an automated email or text message delivered to a consumer's email address or phone number that is registered with a controller for the cell.

At block 508, process 500 can disburse a currently available power supply from each producer to meet the power supply transmission schedule. In these regards, process 500 can execute the schedule in accordance with one or more of the above criteria and the timing discussed above with reference to block 410. For instance, process 500 can coordinate the distribution of power that can be made available from the grid according to a time slot for when a particular entity is operated by a controller to be a power consumer. As another example, process 500 can coordinate the distribution such that a power consumer can receive a specifically allotted amount of power. After such receipt, process 500 can then cycle the disbursement of power from the grid to another consumer.

Figure 6:
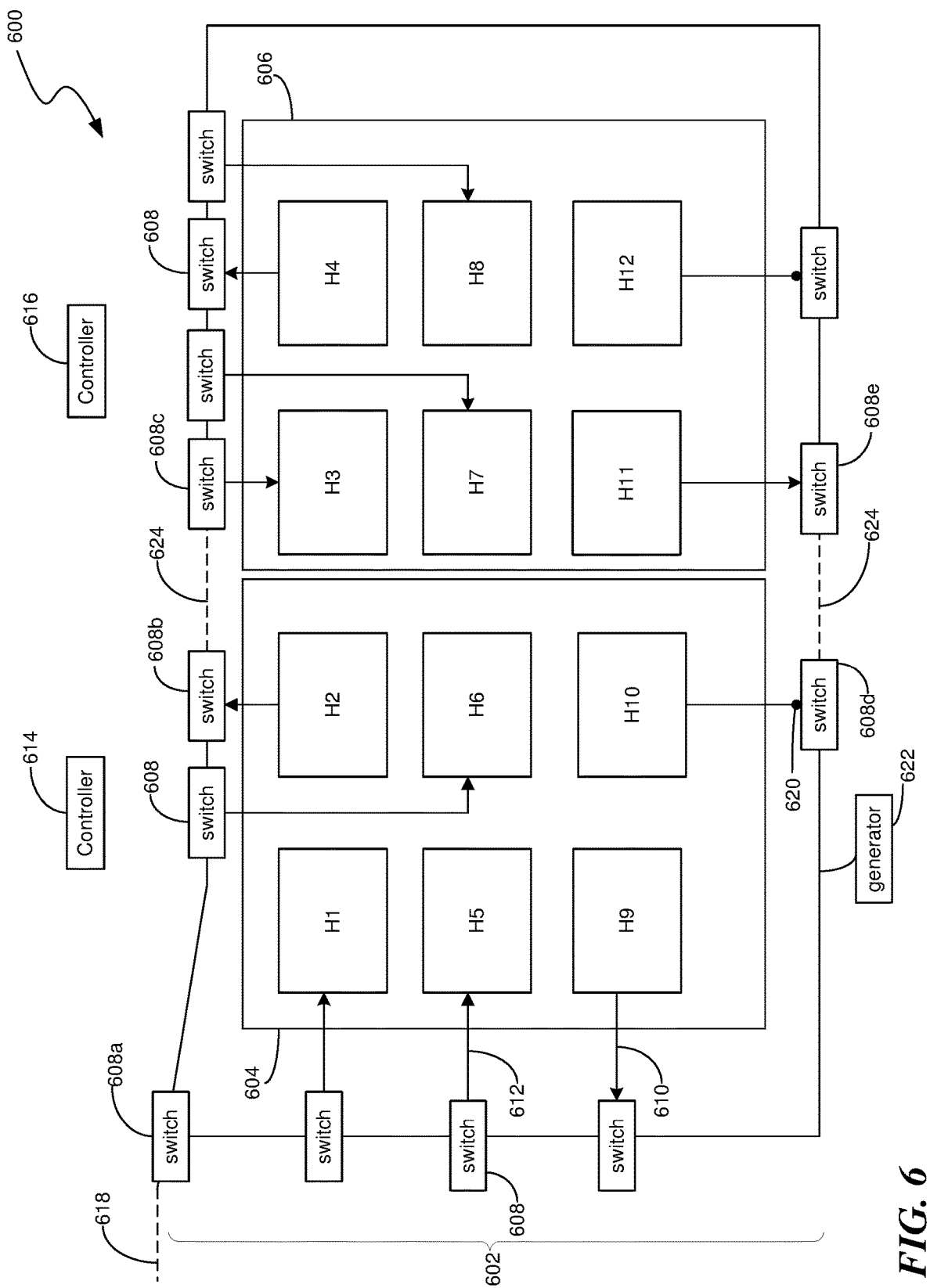
FIG. 6 is a conceptual diagram illustrating an example of an alternative power distribution grid for cells of interlinked entities that can, for an expected power deficiency, be power consumers, power producers, or neither.

FIG. 6 is a conceptual diagram illustrating an example 600 of an alternative power distribution grid 602 for cells 604 and 606 of interlinked entities that can, for an expected power deficiency, be power consumers, power producers, or neither. Cells 604 and 606 each represent a portion of consumer homes or mobile generators H1-H12, where the power that can be produced and consumed by those entities are provided via a solar energy system, a wind turbine energy system, and/or a gasoline generator energy system (each not shown).

As shown, each of the entities H1-H12 is interlinked by the power distribution grid 602 and connected to the grid 602 via respective switches 608 for allowing power to be consumed or contributed to the grid 602. For instance, an arrow 610 extending out of a cell 604 or 606 and toward a switch 608 indicates for the associated home that it is a power producer, while an arrow 612 extending into a cell 604 or 606 and away from a switch 608 indicates for the associated home that it is a power consumer. As is also shown, controllers 614 and 616 are respectively associated to cells 604 and 606 to control power consumption from and contribution to the grid 602. That is, such consumption and contribution can be controlled via operation of controllers 614 and 616 for respective ones of switches 608, where each switch 608 can regulate an amount of power that can pass through it. More particularly, each switch 608 can be controlled to permit or disallow power to be transferred from or to the grid 602 in accordance with the power supply distribution schedule discussed herein. A power feed 618 normally associated with the grid 602 is shown in broken lines to indicate a disruption due to an expected power deficiency. For instance, a switch 608a directly proximate the feed 618 can, in response to the deficiency, be operated by at least one of the controllers 614 and 616 to disallow power to enter or leave the grid 602 through that switch 608a. Further, the controllers 614 and/or 616 have invoked at least two of switches 608b-608e to isolate cell 604 from cell 606 (as shown by broken lines 624).

One or more of the switches 608 for cell 604 can be operated by the controller 614 to coordinate the flow of power to or from the grid 602 such that entities H2 and H9 are power producers, entities H1, H5, and H6 are power consumers, and entity H10 is blocked (as shown by the round icon at 620) from producing or consuming in the cell 604 (i.e., is neither a power producer nor a power consumer). Similarly as in the case of cell 606, power distribution for cell 606 can be controlled by operation of controller 616 on switches 608 for that cell. As a result, entities H4 and H11 are power producers, entities H3, H7, and H8 are power consumers, and entity H12 is inert—neither producing nor consuming power from cell 606.

In some implementations, control for cells 604 and 606 can be coordinated to allow collective power consumption from and contribution to the grid 602. That is, controllers 614 and 616 can be in communication with each other to allow power produced by homes in each of the cells to be aggregated for the grid 602 and shared among all consumers within the cells 604, 606, or to other portions of the power grid via connection 618. In some cases, such aggregated power can include power that can be provided by a mobile generator 622 tied into the grid 602, assuming synchronization (e.g., voltage, frequency, phase angle and sequence, waveform).

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method of distributing power, the method comprising:
   defining a cell of entities interlinked by a power distribution grid, wherein the power distribution grid can isolate the interlinked entities from other power consuming facilities,
      wherein at least some of the entities have a power switch, operable by a controller, that controls whether one or more of the at least some of the entities are operating as a power consuming, a power producing, or neither entity in the cell;
   identifying an expected power deficiency for the cell; and
   in response to the expected power deficiency, controlling the power switches to:
      enact the isolation of the interlinked entities in the cell from the other power consuming facilities; and
      establish at least one of the entities to operate as a power producing entity and to disburse, into the cell, an available power supply collectively sourced from the established at least one of the power producing entities, based on a power supply transmission schedule for the cell, the power supply transmission schedule defining which one or more of the entities are current power consuming entities in the cell.

2. The method of claim 1, wherein one or more of the entities comprise a consumer home.

3. The method of claim 1, wherein one or more of the entities comprise a mobile power producing system connected to the cell in response to the expected power deficiency for the cell.

4. The method of claim 1, wherein the defining the cell of entities is based on one or more of a determination of which of the entities are anticipated to experience the expected power deficiency, an amount of power allocated to one or more of the entities, an ability of an entity to produce power, or any combination thereof.

5. The method of claim 1, wherein, at least one entity established to operate as a power producing entity sources a portion of the available power supply via one or more of a solar energy system, a wind turbine energy system, a gasoline operated generator energy system, or any combination thereof.

6. The method of claim 1, wherein the expected power deficiency for the cell is based on an identified emergency situation.

7. The method of claim 1, wherein the portion of the available power supply sourced from an entity established to operate as a power producing entity comprises an excess amount of power for an allocation of power provided by one or more power production systems for that entity.

8. A computing system for distributing power, the computing system comprising:
   one or more processors; and
   one or more memories storing instructions that, when executed by the one or more processors, cause the computing system to perform a process comprising:
      defining a cell of entities interlinked by a power distribution grid, wherein the power distribution grid can isolate the interlinked entities from other power consuming facilities,
         wherein at least some of the entities have a power switch, operable by a controller, that controls whether one or more of the at least some of the entities are operating as a power consuming, a power producing, or neither entity in the cell;
      identifying an expected power deficiency for the cell; and
      in response to the expected power deficiency, controlling the power switches to:
         enact the isolation of the interlinked entities in the cell from the other power consuming facilities; and
         establish at least one of the entities to operate as a power producing entity and to disburse, into the cell, an available power supply collectively sourced from the established at least one of the power producing entities, based on a power supply transmission schedule for the cell, the power supply transmission schedule defining which one or more of the entities are current power consuming entities in the cell.

9. The computing system of claim 8, wherein one or more of the entities comprise a consumer home.

10. The computing system of claim 8, wherein one or more of the entities comprise a mobile power producing system connected to the cell in response to the expected power deficiency for the cell.

11. The computing system of claim 8,
wherein the defining the cell of entities is based on one or more of a determination of which of the entities are anticipated to experience the expected power deficiency, an amount of power allocated to one or more of the entities, an ability of an entity to produce power, or any combination thereof.

12. The computing system of claim 8,
wherein, at least one entity established to operate as a power producing entity sources a portion of the available power supply via one or more of a solar energy system, a wind turbine energy system, a gasoline operated generator energy system, or any combination thereof.

13. The computing system of claim 8,
wherein the expected power deficiency for the cell is based on an identified emergency situation.

14. The computing system of claim 8,
wherein the portion of the available power supply sourced from an entity established to operate as a power producing entity comprises an excess amount of power for an allocation of power provided by one or more power production systems for that entity.

15. A non-transitory machine-readable storage medium having machine-executable instructions stored thereon that, when executed by one or more processors, cause the one or more processors to perform a method for distributing power, the method comprising:
 defining a cell of entities interlinked by a power distribution grid, wherein the power distribution grid can isolate the interlinked entities from other power consuming facilities,
  wherein at least one of the entities can operate as a power producing entity, and
  wherein at least some of the entities have a power switch, operable by a controller, that controls whether one or more of the at least some of the entities are operating as a power consuming entity in the cell;
 identifying an expected power deficiency for the cell; and
 in response to the expected power deficiency, controlling the power switches to:
  enact the isolation of the interlinked entities in the cell from the other power consuming facilities; and
  establish at least one of the entities, having a power switch that is operable by the controller, to operate as a power producing entity and to disburse, into the cell, an available power supply collectively sourced from the established at least one of the power producing entities, based on a power supply transmission schedule for the cell, the power supply transmission schedule defining which one or more of the entities are current power consuming entities in the cell.

16. The non-transitory machine-readable storage medium of claim 15,
wherein one or more of the entities comprise a consumer home; and
wherein the controller controls the power switches to, according to the power supply transmission schedule, cycle which one or more of the entities are the one or more current power consuming entities in the cell.

17. The non-transitory machine-readable storage medium of claim 15,
wherein the at least one of the entities that can operate as a power producing entity comprises a mobile power producing system connected to the cell in response to the expected power deficiency for the cell; and
wherein the method further comprises disbursing an amount of power produced by the mobile power producing system throughout the cell in accordance with the power supply transmission schedule for the cell.

18. The non-transitory machine-readable storage medium of claim 15,
wherein the defining the cell of entities is based on one or more of a determination of which of the entities are anticipated to experience the expected power deficiency, an amount of power allocated to one or more of the entities, an ability of an entity to produce power, or any combination thereof.

19. The non-transitory machine-readable storage medium of claim 15,
wherein, at least one entity established to operate as a power producing entity sources a portion of the available power supply via one or more of a solar energy system, a wind turbine energy system, a gasoline operated generator energy system, or any combination thereof; and
wherein the portion of the available power supply sourced from an entity established to operate as a power producing entity comprises an excess amount of power for an allocation of power provided by one or more power production systems for that entity.

20. The non-transitory machine-readable storage medium of claim 15,
wherein the expected power deficiency for the cell is based on an identified emergency situation;
wherein the method further comprises notifying the one or more current power consuming entities of a timing, according to the power supply transmission schedule, for power consumption.

* * * * *